United States Patent
Jogand et al.

[11] Patent Number: 6,036,867
[45] Date of Patent: Mar. 14, 2000

[54] METHOD FOR DESALINATING AND DEMINERALIZING SOLUTIONS CONTAINING ACIDS AND/OR METAL SALTS

[75] Inventors: Henri Louis Armand Jogand, Rueil; Pierre-Alain Jean Henri Peron, Chatou, both of France

[73] Assignee: Degremont, Rueil-Malmaison, France

[21] Appl. No.: 09/043,828

[22] PCT Filed: Nov. 27, 1996

[86] PCT No.: PCT/FR96/01878

§ 371 Date: Jun. 15, 1998

§ 102(e) Date: Jun. 15, 1998

[87] PCT Pub. No.: WO97/21632

PCT Pub. Date: Jun. 19, 1997

[30] Foreign Application Priority Data

Dec. 13, 1995 [FR] France ................................. 95 14775
Apr. 3, 1996 [FR] France ................................. 96 04195

[51] Int. Cl.⁷ .................................................. B01D 21/00
[52] U.S. Cl. ........................... 210/696; 210/710; 210/721
[58] Field of Search ....................... 210/696, 698, 210/699, 701, 710, 712, 721, 768

[56] References Cited

U.S. PATENT DOCUMENTS

| 4,175,100 | 11/1979 | Schiller et al. | 525/327 |
| 4,634,532 | 1/1987 | Logan et al. | 210/697 |
| 4,956,157 | 9/1990 | Nasu | 423/104 |
| 5,685,980 | 11/1997 | Patapoff et al. | 210/244 |

*Primary Examiner*—David A. Simmons
*Assistant Examiner*—Betsey J. Morrison
*Attorney, Agent, or Firm*—Pollock, Vande Sande & Amernick

[57] ABSTRACT

A process for the desalination and demineralization of solutions conmining acids and/or metal salts comprising a number of steps after introducing a solution to be treated. Initially, chemical agents are added to precipitate predetermined salts. Afterward clarification occurs. An inhibitor is then introduced for inhibiting further precipitation of the salts. The process proceeds by concentrating the salts in 5%–80% of tile flow of the solution to be treated into a supersaturated concentrate to form a concentrated fraction, the remaining fraction being a demineralized permeate. There is then removal of the effect of the precipitation inhibitor allowing precipitation of crystallizable supersaturated salts in the concentrate.

6 Claims, 2 Drawing Sheets

METHOD FOR DESALINATING AND DEMINERALIZING SOLUTIONS CONTAINING ACIDS AND/OR METAL SALTS

FIELD OF THE INVENTION

The present invention relates to the qualitative and quantitative reduction of the content of precipitable ions in aqueous or other solutions and to the use of these solutions.

The invention more particularly applies to the desalination and to the demineralization of water, in particular of potable water or of process water, for the purpose of satisfying potability restrictions or restrictions related to the use of water and to the recycling of waste water in industry.

BACKGROUND OF THE INVENTION

Various desalination or demineralization or crystallization processes are currently known. The main processes will be restated hereinbelow with the disadvantages which are associated with them:

the precipitation of salts of very slight solubility which are separated from the treated water by settling or filtration. Thus, French Patent FR-A-2,339,575 discloses a process and a plant for the treatment of water by crystalline precipitation and settling which consists in producing a homogeneous dispersion of water to be treated, of reagents necessary for the crystalline precipitation and of sludges separated from the water to be treated and in settling this dispersion, the crystalline precipitation reaction being completed during the settling. The disadvantage of this known technique lies in the use of reagents which can be very expensive for the purpose of reducing their contents of salts of very slight solubility below their solubility;

percolation through a bed of ion-exchange resins which makes it possible to replace all or part of the ions by other ions. This solution exhibits the disadvantage of high consumption of chemical reagents and that of the production of saline, indeed highly saline, regeneration eluates;

filtration through reverse osmosis or nanofiltration membranes which are selective with respect to certain salts and which concentrate them in a fraction of the treated flow. The disadvantage of this technique lies in the production of a filtration concentrate which represents a significant fraction of the flow of the water to be treated (of the order of 10 to 70%, depending on the initial salinity and the degree of conversion adopted);

evaporation, which produces demineralized water by condensation of the vapor produced and which concentrates the salinity into a brine. This solution leads to very high energy consumption and the production of a saline brine which has to be either discharged or crystallized, the latter stage resulting in a very high investment cost;

electrodialysis, involving ion-exchange membranes which make it possible to extract the inorganic salts from the solutions and to concentrate them into a brine, the purified water flow being separated from the brine flow by the said ion-exchange membranes.

BRIEF DESCRIPTION OF THE INVENTION

The present invention provides for the introduction of a process for desalination or demineralization with the possibility of crystallization which does not exhibit the disadvantages of the currently known solutions briefly restated hereinabove.

The desalination and demineralization process according to the present invention mainly relates to solutes, the solutions of which can be supersaturated by addition of chemical reagents.

The solutes can be, inter alia, inorganic or organic acids and their salts.

Consequently, the subject-matter of the present invention is a process for the desalination, demineralization and optionally crystallization of solutions containing acids and/or metal salts, characterized in that it comprises the following successive stages:

a) conditioning the solutions, clarified before-hand, using a chemical reagent which is an inhibitor of the precipitation of salts, optionally followed by a filtration;

b) concentrating the salts into a supersaturated brine representing a fraction of the flow of between 5 and 80% of the flow of the solution to be treated;

c) in this brine, reducing, indeed removing, the effect of the precipitation inhibitor and precipitating the crystallizable supersaturated salts in the concentrated fraction.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned aspects of the present invention will be more clearly understood when considered in conjunction with the accompanying drawings, in which.

DETAILED DESCRIPTION OF THE INVENTION

Figure 1:
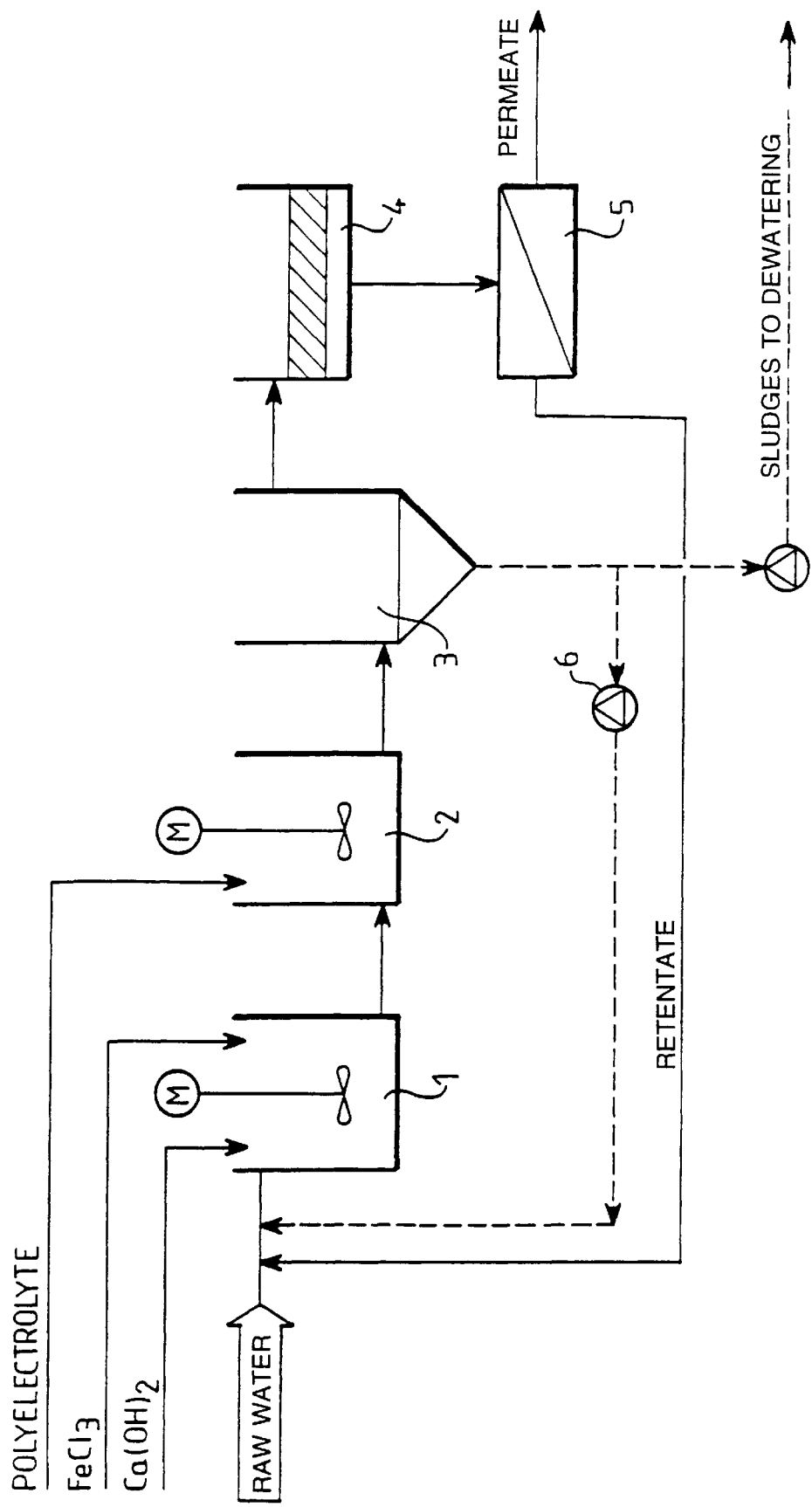
FIG. 1 is a flowchart of a first embodiment of the invention.

According to an embodiment of the process according to the invention as defined hereinabove, an additional preliminary stage of neutralization can be provided consisting of a chemical modification of the solution for the purpose of reaching the solubility product of the ion or ions to be removed. According to the invention, this additional stage is carried out by introducing reagents, for example addition of calcium in the form of calcium chloride or calcium hydroxide, in order to precipitate the sulphates or fluorides. According to the invention, this optional additional preliminary stage of neutralization may or may not be followed by a clarification stage.

According to the invention, a final additional stage can be provided consisting of recycling the concentrated fraction at the head of the clarification stage, before or after the stage of precipitation/crystallization of the supersaturated salts.

According to the present invention, the inhibitors of the precipitation of the salts removed are chosen from the group comprising phosphonates, polyacrylates and polycarboxylates.

According to an embodiment of the process according to the invention, the stage of demineralization of the solution and of concentration of the salts is preferably carried out by filtration through reverse osmosis or nanofiltration membranes, which are selective or otherwise with respect to the ions to be removed, or by evaporation and/or crystallization and/or dialysis and/or electrodialysis and/or electro-electrodialysis.

According to the invention, the reduction, indeed removal, of the effect of the precipitation inhibitor can be carried out using a metal with a valency which may or may not depend on the quality of the precipitation inhibitor, in particular a trivalent metal, and/or by increasing the pH and/or by increasing the temperature and/or by the action of a chemical oxidizing agent and/or by the action of any other chemical additive, inorganic or organic, which makes it possible to neutralize, in all or in part, the activity of the precipitation inhibitor.

As a non-limiting example, results obtained experimentally during the implementation of the process according to the invention on a semi-industrial scale have been given hereinbelow. The effluents treated during this operation were waters originating from the mining industry. In this implementational example, which is without any limiting nature, the following steps were combined: conditioning the waters, saturated with calcium sulphate, with a polyacrylate, filtration through a nanofiltration membrane and destruction of the polyacrylate with a ferric iron salt.

| The starting raw water exhibited the following characteristics: | |
|---|---|
| conductivity: | 7 $\mu$S/cm |
| calcium: | 725 mg/l |
| sulphates: | 2200 mg/l |
| turbidity: | 0.25 NTU |
| pH: | 7.9 |

This water was conditioned using an inhibitor of precipitation of calcium sulphate composed of 2.5 mg/l of polyacrylate.

The water, thus conditioned, was subsequently filtered through a nanofiltration membrane (operating pressure: 7 bar; degree of conversion: 66%).

| The characteristics of the permeate and of the concentrate obtained were respectively as follows: | |
|---|---|
| permeate: | |
| flow: | 66% of the feed flow |
| conductivity: | 5 $\mu$S/cm |
| sulphates: | 100 mg/l |
| turbidity: | 0.2 NTU |
| concentrate: | |
| flow: | 34% of the feed flow |
| conductivity: | 12.5 $\mu$S/cm |
| calcium: | 2150 mg/l |
| sulphates: | 6600 mg/l |
| turbidity: | 0.35 NTU |

The reduction, indeed elimination, of the inhibiting effect on precipitation of the polyacrylate was achieved using 16 mg/l of ferric iron in the concentrate. After self-crystallizing for one hour, the content of soluble polymer was below the detection threshold of the analytical method, i.e. 0.2 mg/l. The content of soluble calcium sulphate was in the region, to within about 5%, of the theoretical solubility of calcium sulphate.

Two implementational examples of plants employing the process according to the present invention have been represented diagrammatically in the appended drawings, as non-limiting illustration.

FIG. 1 refers to a closed-circuit desulphatation plant with recycling of the concentrate from the nanofiltration stage.

It is seen, in this FIG. 1, that the water to be treated is subjected beforehand in 1 to a neutralization-precipitation treatment with introduction of calcium compounds (Ca(OH)$_2$, CaCl$_2$), followed by flocculation in 2 and then by settling in 3 (in this implementational example, a lamellar settling tank can be used). In this device, a portion of the sludges is recycled at the head of the plant, the remainder being subjected to a dewatering stage as shown in this FIG. 1. The clarified water is conditioned by the inhibitor of precipitation of the calcium sulphate, before being filtered, for example, through a sand filter 4. The stage of desulphatation of the water and of concentration of the sulphate salts is here carried out through a nanofiltration membrane 5. The permeate is subsequently discharged and the concentrate is recycled at the head of the process, as has been shown in FIG. 1. The crystallization of the supersaturated salts in the concentrate is promoted by virtue of mixing the crystals from the settling tank with the concentrate, for example via a jet pump, thus using the available energy on the concentrate.

Figure 2:
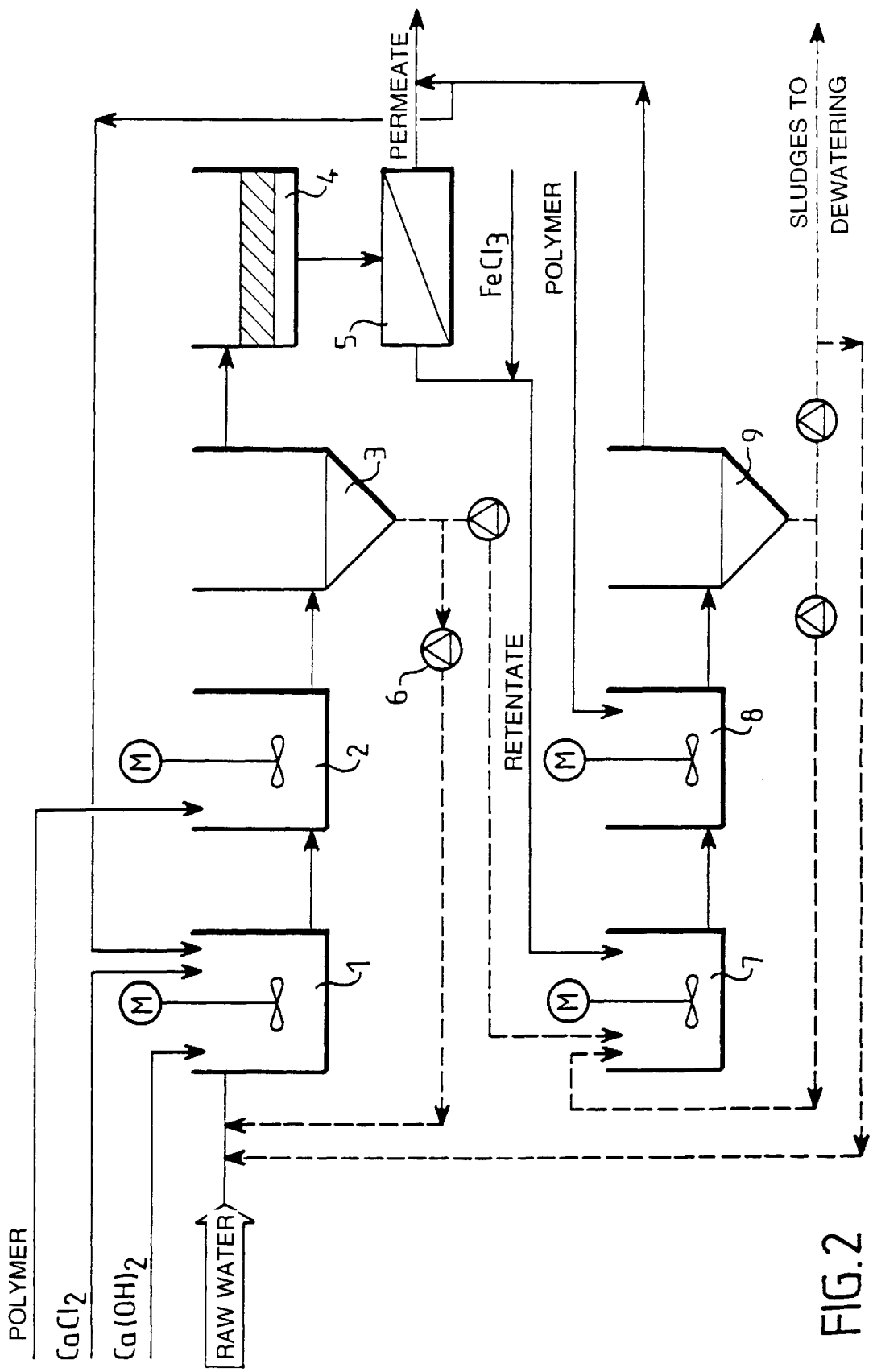
FIG. 2 is a flowchart of a second embodiment of the invention.

FIG. 2 refers to a desulphatation plant operating in an open and/or semi-open circuit, with independent treatment and total or partial discharge of the concentrate from the nanofiltration.

The same plant is found in this FIG. 2 as that described above with reference to FIG. 1, the difference being that the concentrate from the nanofiltration is subjected to crystallization-coagulation treatment in 7, then flocculation in 8 and finally settling in 9, the water saturated with calcium sulphate subsequently being discharged.

Mention may be made, among the advantages of the process which is the subject-matter of the present invention, of the following in particular:

low operating costs with respect to reagents (calcium salts, calcium chloride or calcium hydroxide, inhibitor of precipitation of salts, metal salt), removal of anions, such as sulphates, phosphates, carbonates or fluorides, and of silica in the form of precipitates of metal salts or of hydroxides which can be easily dewatered (this list not being limiting), removal of cations, such as calcium, strontium, barium and other heavy metals, in the form of simple or complex metal salts or in the form of hydroxides, possibility of producing a flow of treated water (degree of conversion) in the region of 100% of the flow of raw water (the difference arising from the water discharged with the metal precipitates).

It remains, of course, that the present invention is not limited to the implementational or production examples described and/or represented here but that it encompasses all the alternative forms thereof.

We claim:

1. A process for the desalination and demineralization of solutions containing acids and/or metal salts and comprising the steps:

introducing a solution to be treated;

introducing an inhibitor for inhibiting precipitation of predetermined salts in the solution;

concentrating the salts in 5%–80% of the flow of the solution to be treated into a supersaturated concentrate to form a concentrated fraction, the remaining fraction being a demineralized permeate;

removing the effect of the precipitation inhibitor;

precipitating crystallizable supersaturated salts in the concentrate; and introducing reagents into the solution, prior to the introduction of an inhibitor, that precipitate the salts by affecting the solubility product of solutes to be precipitated.

2. The process according to claim 1 further comprising clarifying the solution after neutralization.

3. A process for the desalination and demineralization of solutions containing acids and/or metal salts and comprising the steps:

introducing a solution to be treated;

introducing an inhibitor for inhibiting precipitation of predetermined salts in the solution;

concentrating the salts in 5%–80% of the flow of the solution to be treated into a supersaturated concentrate to form a concentrated fraction, the remaining fraction being a demineralized permeate;

removing the effect of the precipitation inhibitor;

precipitating crystallizable supersaturated salts in the concentrate;

wherein the step of removing the effect of the precipitation inhibitor comprises the introduction of a metal.

4. A process for the desalination and demineralization of solutions containing acids and/or metal salts and comprising the steps:

introducing a solution to be treated;

introducing an inhibitor for inhibiting precipitation of predetermined salts in the solution;

concentrating the salts in 5%–80% of the flow of the solution to be treated into a supersaturated concentrate to form a concentrated fraction, the remaining fraction being a demineralized permeate;

removing the effect of the precipitation inhibitor;

precipitating crystallizable supersaturated salts in the concentrate;

wherein the step of removing the effect of the precipitation inhibitor further comprises introducing a trivalent metal.

5. A process for the desalination and demineralization of solutions containing acids and/or metal salts and comprising the steps:

introducing a solution to be treated;

introducing an inhibitor or inhibiting precipitation of predetermined salts in the solution;

concentrating the salts in 5%–80% of the flow of the solution to be treated into a supersaturated concentrate to form a concentrated fraction, the remaining fraction being a demineralized permeate;

removing the effect of the precipitation inhibitor;

precipitating crystallizable supersaturated salts in the concentrate;

wherein the step of removing the effect of the precipitation inhibitor further comprises introducing a chemical oxidizing agent.

6. A process for the desalination and demineralization of solutions containing acids and/or metal salts and comprising the steps:

introducing a solution to be treated;

introducing an inhibitor for inhibiting precipitation of predetermined salts in the solution;

concentrating the salts in 5%–80% of the flow of the solution to be treated into a supersaturated concentrate to form a concentrated fraction, the remaining fraction being a demineralized permeate;

removing the effect of the precipitation inhibitor;

precipitating crystallizable supersaturated salts in the concentrate;

wherein the step of removing the effect of the precipitation inhibitor further comprises introducing a chemical additive that is capable of neutralizing activity of the precipitation inhibitor.

* * * * *